United States Patent
Colle et al.

(10) Patent No.: US 10,608,900 B2
(45) Date of Patent: Mar. 31, 2020

(54) GENERATING A DEFERRABLE DATA FLOW

(71) Applicant: MICROSOFT TECHNOLOGY LICENSING, LLC, Redmond, WA (US)

(72) Inventors: Olivier Colle, Bellevue, WA (US); Jaideep Sarkar, Redmond, WA (US); Muralidhar Sathsahayaraman, Bothell, WA (US); Radu Bogdan Gruian, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 226 days.

(21) Appl. No.: 14/932,554

(22) Filed: Nov. 4, 2015

(65) Prior Publication Data

US 2017/0126513 A1 May 4, 2017

(51) Int. Cl.
   *G06F 16/957* (2019.01)
   *H04L 12/24* (2006.01)
   (Continued)

(52) U.S. Cl.
   CPC ........ *H04L 41/5054* (2013.01); *G06F 16/957* (2019.01); *G06F 16/9574* (2019.01);
   (Continued)

(58) Field of Classification Search
   None
   See application file for complete search history.

(56) References Cited

U.S. PATENT DOCUMENTS

| 7,926,066 B2 | 4/2011 | Zakon et al. |
| 8,418,132 B2 | 4/2013 | Williams et al. |

(Continued)

FOREIGN PATENT DOCUMENTS

| CA | 2904645 A1 | 9/2014 |
| CN | 103984883 A | 8/2014 |

(Continued)

OTHER PUBLICATIONS

Hyakuna, Yoko., "Integrating RESTful web services into a business application in IBM Business Process Manager", Published on: Dec. 11, 2013, 29 pages Available at: http://www.ibm.com/developerworks/bpm/library/techarticles/1312_hyakuna/1312_hyakuna.html.

(Continued)

*Primary Examiner* — Joshua Joo

(57) ABSTRACT

Examples of the disclosure enable one or more operations to be executed or implemented while managing computational resources. In some examples, an instruction to implement a first operation is received. The first operation is associated with a first node of a plurality of nodes. The plurality of nodes are arranged in a plurality of regions. A second node of the plurality of nodes that is related to the first node is identified. On condition that the second node is arranged in an active region of the plurality of regions, a second operation associated with the second node is implemented within a period of time. On condition that the second node is not arranged in the active region, the second operation is not implemented within the period of time. Aspects of the disclosure enable a computing device to defer the implementation of an operation to facilitate managing computational resources.

20 Claims, 8 Drawing Sheets

(51) Int. Cl.
*H04L 12/26* (2006.01)
*H04L 29/08* (2006.01)

(52) U.S. Cl.
CPC .......... *H04L 41/12* (2013.01); *H04L 43/0852* (2013.01); *H04L 67/10* (2013.01); *H04L 41/0896* (2013.01); *H04L 41/5009* (2013.01); *H04L 41/5067* (2013.01); *H04L 41/5096* (2013.01)

(56) References Cited

U.S. PATENT DOCUMENTS

| | | | |
|---|---|---|---|
| 8,478,616 | B2 | 7/2013 | De Klerk et al. |
| 8,584,114 | B2 | 11/2013 | Rabinovich et al. |
| 8,589,864 | B2 | 11/2013 | Andrade et al. |
| 8,656,342 | B2 | 2/2014 | Grechanik et al. |
| 8,738,589 | B2 | 5/2014 | Stark et al. |
| 8,869,106 | B2 | 10/2014 | Jazdzewski et al. |
| 8,893,014 | B1 | 11/2014 | Au et al. |
| 8,943,424 | B2 | 1/2015 | Mendel et al. |
| 2006/0230021 | A1* | 10/2006 | Diab ................ G06F 16/954 |
| 2009/0044145 | A1* | 2/2009 | Seo ................ G06Q 30/02 715/804 |
| 2010/0017702 | A1* | 1/2010 | Carroll ............ G06F 17/30958 715/234 |
| 2011/0302565 | A1 | 12/2011 | Ferris et al. |
| 2012/0096375 | A1* | 4/2012 | Bostick ........... G06F 17/30864 715/765 |
| 2012/0198318 | A1 | 8/2012 | Graves et al. |
| 2012/0260181 | A1* | 10/2012 | Sule ............... G06F 9/4843 715/736 |
| 2012/0317504 | A1 | 12/2012 | Patel et al. |
| 2012/0331392 | A1* | 12/2012 | Akolkar .......... G06F 17/30873 715/738 |
| 2014/0108931 | A1* | 4/2014 | Howard ............ G06T 11/60 715/716 |
| 2014/0108941 | A1 | 4/2014 | Joel et al. |
| 2015/0058831 | A1 | 2/2015 | Warren |
| 2015/0088970 | A1 | 3/2015 | Wei et al. |
| 2016/0078010 | A1* | 3/2016 | Huang ............ G06F 17/30902 715/201 |
| 2016/0188549 | A1* | 6/2016 | Wei ................ H04L 67/10 715/744 |
| 2016/0283091 | A1* | 9/2016 | Hang ............... G06Q 10/02 |
| 2017/0094004 | A1* | 3/2017 | Barraclough ...... H04L 67/2847 |
| 2017/0161239 | A1* | 6/2017 | Newton ........... G06F 17/30861 |

FOREIGN PATENT DOCUMENTS

| | | | |
|---|---|---|---|
| WO | 2014169160 A2 | 10/2014 | |
| WO | WO 2014169751 A1 * | 10/2014 | ....... G06F 17/30902 |
| WO | 2015041711 A1 | 3/2015 | |
| WO | 2015063259 A1 | 5/2015 | |

OTHER PUBLICATIONS

"Modeling a Composite Application Using CAF Diagram", Retrieved on: Aug. 5, 2015, 3 pages Available at: http://help.sap.com/saphelp_nw73/helpdata/en/65/1f048690844787864b93ccf3bff13b/content.htm.

"International Search Report and Written Opinion Issued in PCT Application No. PCT/US2016/060002", dated Feb. 6, 2017, 14 Pages.

"International Preliminary Report on Patentability Issued in PCT Application No. PCT/US2016/060002", dated Oct. 13, 2017, 8 Pages.

"Office Action Issued in European Patent Application No. 16805559.8", dated May 23, 2019, 8 Pages.

* cited by examiner

GENERATING A DEFERRABLE DATA FLOW

BACKGROUND

Known cloud computing devices provide a variety of computing, networking, and/or storage services over a network (e.g., the Internet). Cloud services may be available, for example, at a remote computing device coupled to the network. From a client perspective, cloud services appear to be provided from a single source (e.g., the "Cloud"). However, applications and programs that are implemented to provide cloud services may be distributed across a plurality of resources (e.g., servers, virtual machines). Real-time implementation of operations (e.g., implementing operations, or computations, as they are being called or requested) increases a burden on the resources, as well as the communications between the resources. With the increasing demand for cloud services, known cloud computing devices may become overburdened, resulting in slower, inconsistent service.

SUMMARY

Examples of the disclosure enable one or more operations to be executed or implemented while managing computational resources. In some examples, an instruction to implement a first operation is received. The first operation is associated with a first node of a plurality of nodes. The plurality of nodes are arranged in a plurality of regions. A second node of the plurality of nodes that is related to the first node is identified. On condition that the second node is arranged in an active region of the plurality of regions, a second operation associated with the second node is implemented within a period of time. On condition that the second node is not arranged in the active region, the second operation is not implemented within the period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
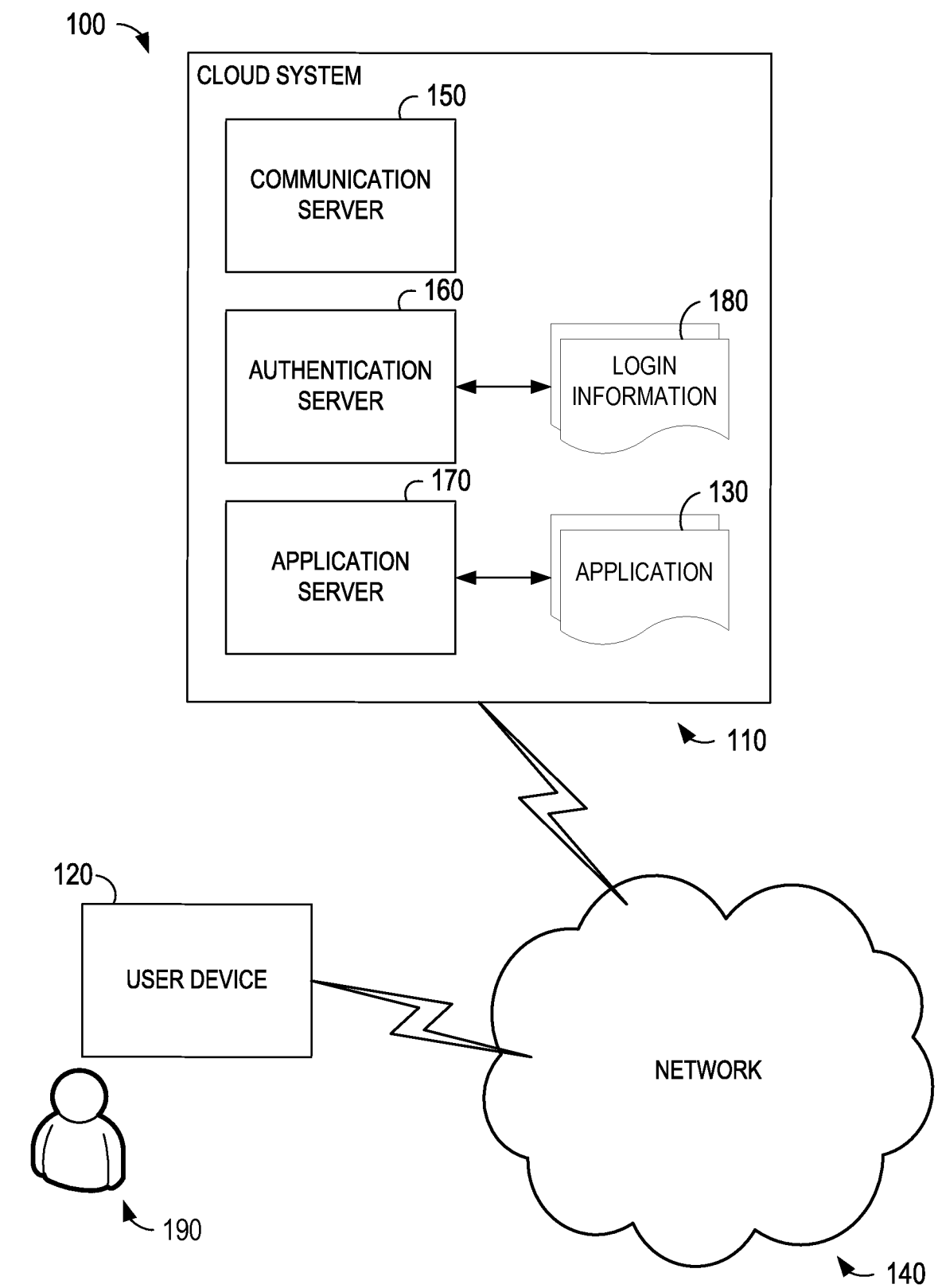
FIG. 1 is a block diagram of an example environment including a user device coupled to a cloud system.

The subject matter described herein is related generally to the generation of data flows and, more particularly, to an incremental or smart generation of data flows including one or more deferrable data flows based on a relationship between entities. In some examples, one or more operations are executed or implemented while computational resources are managed. At least some operations may be implemented within a period of time (e.g., imminently, in real-time) while other operations may be deferred and implemented after the period of time expires. For example, an instruction to implement a first operation associated with a first node is received, and a second node that is related to the first node is identified. If the second node is associated with an active region, a second operation associated with the second node is implemented within the period of time. On the other hand, if the second node is not associated with the active region, the second operation is not implemented within the period of time.

The examples described herein determine statically (e.g., predetermine) when to implement at least some operations to facilitate managing computational resources. For example, the examples described herein may implement one or more operations based on whether an operation affects an active page being displayed on or by a presentation device. The examples described herein may be implemented using computer programming or engineering techniques including computing software, firmware, hardware, or a combination or subset thereof. Aspects of the disclosure enable transforms between nodes (e.g., data flow) to be generated and/or transmitted in an efficient and effective manner for increased performance. For example, a first node may be activated or triggered to affect (e.g., change, manipulate) a presentation of a first entity associated with the first node (e.g., a first object presented on a display) on or by a presentation device. In some examples, the activation of the first node affects a presentation of a second entity (e.g., the second entity is changed or manipulated based on the activation of the first node) on or by the presentation device. The second entity may not be presented by the presentation device or a change or manipulation of the first entity may not affect the presentation of the second entity on or by the presentation device. In such examples, the change or manipulation of the second entity may be deferred to facilitate managing computational resources.

The examples described herein manage one or more operations or computations associated with generated executable representations for a dependency graph including one or more entities. By generating and/or transmitting transforms between entities in the manner described in this disclosure, some examples reduce processing load and/or increase processing speed by deferring the implementation of operations not perceivable within a period of time (e.g., imminently, in real-time). The net effect of the deferral process improves performance of the steady-state evaluation of declarative transforms. At the very least, the user perception of performance may be increased because computations or operations are evaluated as needed (e.g., as is perceptible by the user). Additionally, some examples may conserve memory, reduce network bandwidth usage, improve operating system resource allocation, and/or improve communication between computing devices by streamlining at least some operations, improve user efficiency and/or user interaction performance via user interface interaction, and/or reduce error rate by automating at least some operations.

For example, the dependency graph may facilitate increasing a performance of applications that utilize one or more web operations. As one example, if a slider entity (or control) changes value in a first user interface page, it may initiate a web operation to place a file in a cloud based storage folder. The file appearing in the cloud based storage folder may then affect the state of another entity on a second user interface page. The sequence of events, run in the cloud, may take some considerable time. Yet, in the example, the user of the applications would want to see the slider control change value in a reasonable amount of time after the slider position was adjusted. Accordingly, the subject matter described herein considers resource allocation and when to process operations to increase at least perceivable performance.

FIG. 1 is a block diagram of an example environment 100 including a cloud system 110 and a user device 120 coupled to the cloud system 110. The user device 120 may, for example, communicate with the cloud system 110 to generate and/or modify one or more applications or "apps" 130 (e.g., web app, mobile app, logic app, application programming interface (API) app). In some examples, the environment 100 includes one or more cloud systems 110, and the user device 120 may be coupled to the one or more cloud systems 110 via one or more networks 140. Example networks 140 include a personal area network, a local area network, a wide area network, a cellular or mobile network, and the Internet. Alternatively, the network 140 may be any communication medium that enables the cloud system 110 to communicate with the user device 120 and/or with another cloud system 110.

The cloud system 110 is configured to perform one or more operations. For example, the cloud system 110 may include and/or have access to a communication server 150, an authentication server 160, and/or an application server 170. In some examples, the communication server 150 is configured to control communication (e.g., data flow) between one or more computing devices (e.g., cloud system 110, communication server 150, authentication server 160, application server 170) and the user device 120. Communication between the cloud system 110 and the user device 120 may occur using any protocol or mechanism over any wired or wireless connection. For example, the cloud system 110 may communicate with the user device 120 via the network 140.

The user device 120 may initiate a request to the cloud system 110 (e.g., via the communication server 150) to generate, modify, and/or access one or more applications 130. For example, the user device 120 may access data associated with the cloud system 110 to perform one or more operations. In some examples, the authentication server 160 is configured to manage, store, and/or have access to registered login information 180 (e.g., identification, password), and, based on the registered login information 180, determine whether the user device 120 or a user 190 associated with the user device 120 is authorized to access data associated with the cloud system 110. For example, the registered login information 180 may be associated with a registered user device and/or a registered user authorized to access data associated with the cloud system 110 (e.g., a whitelist). Additionally or alternatively, the registered login information 180 may be associated with a registered user device and/or a registered user not authorized to access data associated with the cloud system 110 (e.g., a blacklist).

The authentication server 160 may receive user input (e.g., identification, password) from the user device 120 (e.g., via the communication server 150), and compare the received user input with the registered login information 180 to determine whether the user device 120 or user 190 is authorized to access data associated with the cloud system 110. For example, upon determining that the received user input matches or corresponds to registered login information 180 associated with a whitelist, the authentication server 160 determines that the user device 120 is authorized to access data associated with the cloud system 110 and selectively allows the user device 120 to access data associated with the cloud system 110. On the other hand, upon determining that the received user input matches or corresponds to registered login information 180 associated with a blacklist or does not match or correspond to registered login information 180, the authentication server 160 determines that the user device 120 is not authorized to access data associated with the cloud system 110 and selectively restricts the user device 120 from accessing data associated with the cloud system 110.

The authentication server 160 may transmit a security token (e.g., single sign-on (SSO) token, reduced sign-on (RSO) token) to the user device 120 (e.g., via the communication server 150). The security token is configured to allow the user device 120 to access data associated with one or more computing devices (e.g., cloud system 110, communication server 150, authentication server 160, application server 170) without providing user input for each computing device. In some examples, the user device 120 and/or user 190 may be authorized to access (or restricted from accessing) one or more computing devices and/or perform one or more operations based on a role associated with the user device 120 and/or user 190 (e.g., administrator, author, user, writer, reader, parent, child).

In some examples, the application server 170 is configured to manage and/or store one or more applications 130 and communicate with the user device 120 (e.g., via the communication server 150) to allow the user 190 to generate, modify, and/or access one or more applications 130 using the user device 120. The application 130 may be configured to perform one or more operations and may include any combination of computing software, firmware, hardware, or a combination or subset thereof. For example, the application 130 may be configured to present an image or a series of images (e.g., a video) on a display, play audio, and/or send a service call to access data associated with another computing device (e.g., cloud system 110).

Figure 2:
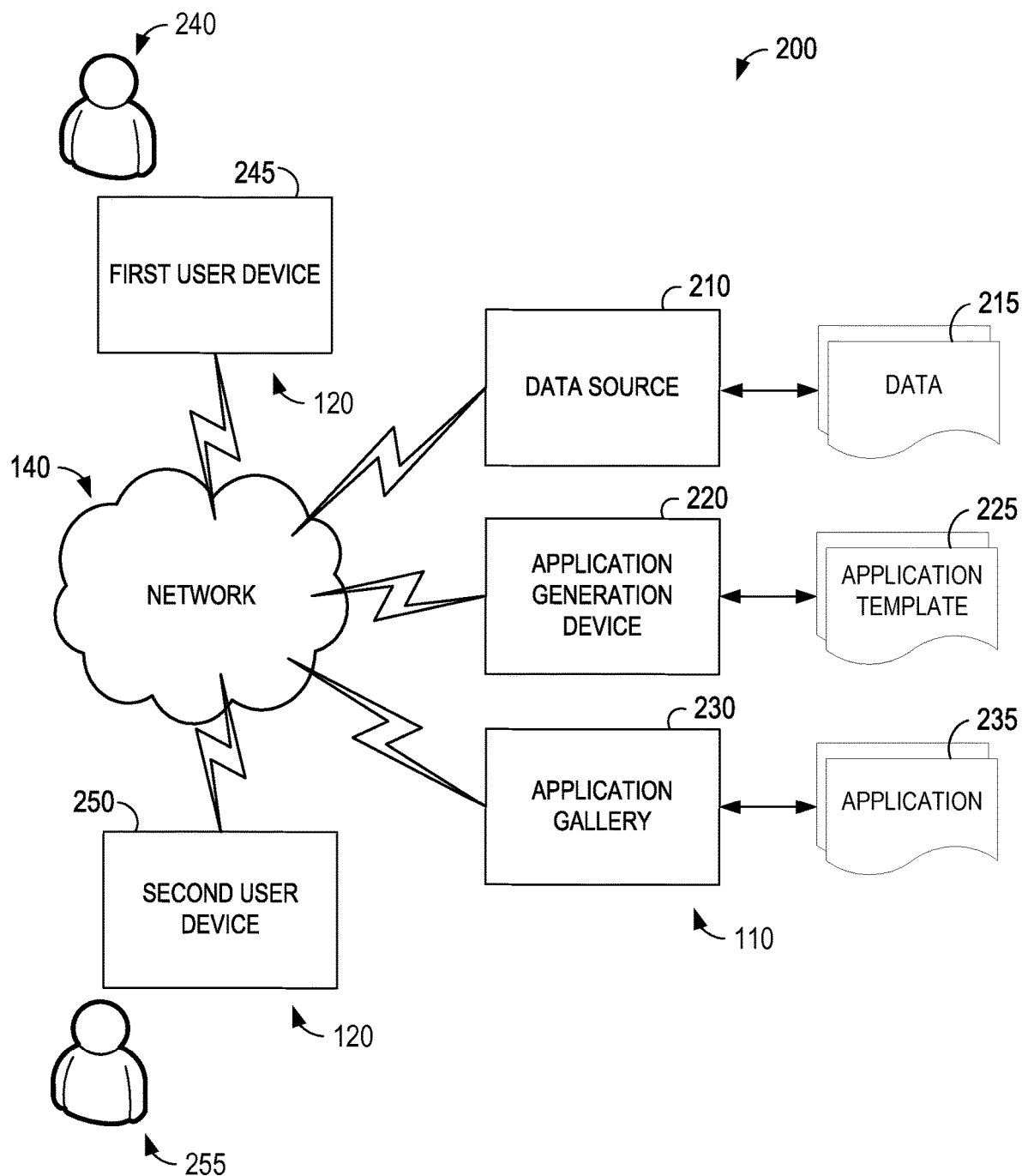
FIG. 2 is a block diagram of an example environment in which an application may be generated and/or modified.

FIG. 2 is a block diagram of an example environment 200 in which one or more applications 130 (shown in FIG. 1) may be generated and/or modified. In some examples, the environment 200 includes one or more cloud systems 110. Example cloud systems 110 include a data source 210 configured to manage and/or store data 215, an application generation device 220 configured to manage and/or store one or more application templates 225, and/or an application gallery 230 configured to manage and/or store one or more applications 235 (e.g., applications 130).

A first user 240 may operate or use a first user device 245 (e.g., user device 120) to access one or more cloud systems 110 and generate one or more applications 130. For example, the first user device 245 may communicate with the data source 210, the application generation device 220, and/or the application gallery 230 via the network 140. In some examples, the first user device 245 may retrieve data 215 from the data source 210 and an application template 225 from the application generation device 220, and populate the retrieved application template 225 with the retrieved data 215 to generate an application 235. The first user device 245 may transmit the generated application 235 to the application gallery 230 such that the generated application 235 is available for retrieval (e.g., via download) by a second user device 250 (e.g., another user device 120).

In some examples, the first user 240 and/or first user device 245 are associated with an author role (e.g., a role with edit permissions), which is authorized to generate and/or modify an application 235. One or more second user devices 250 and/or second users 255 associated with the second user devices 250 may be associated with a reader role (e.g., a role with read permissions), which is authorized to access and/or view the application 235 but not generate and/or modify the application 235.

Figure 3:
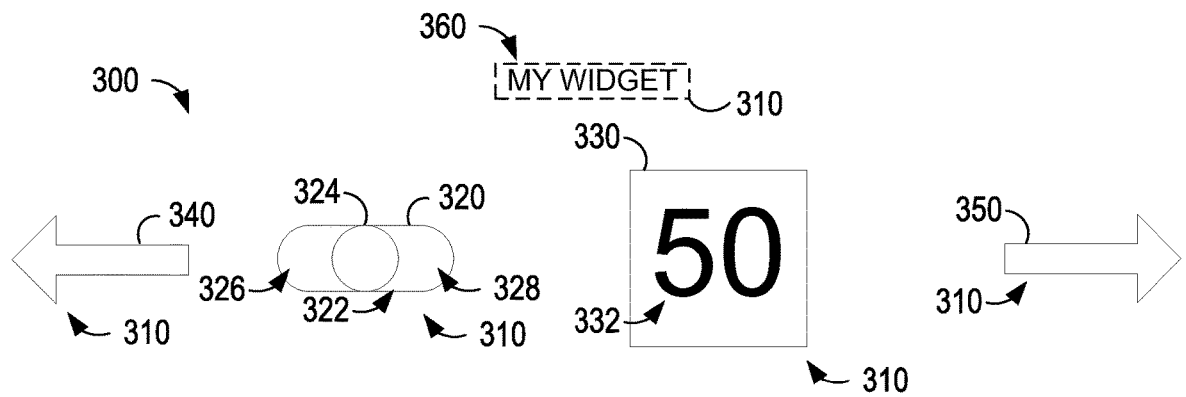
FIGS. 3-5 are partial screenshots of an example page of an application including a plurality of entities.
Figure 4:
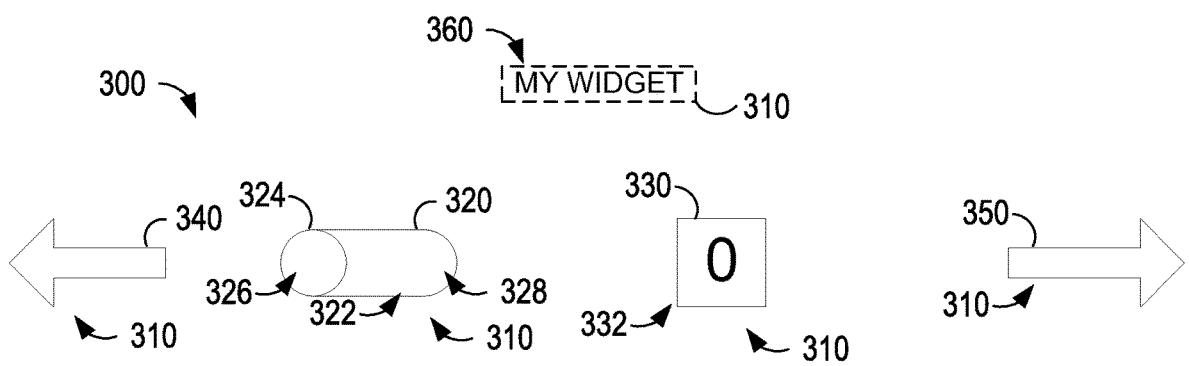
Figure 5:
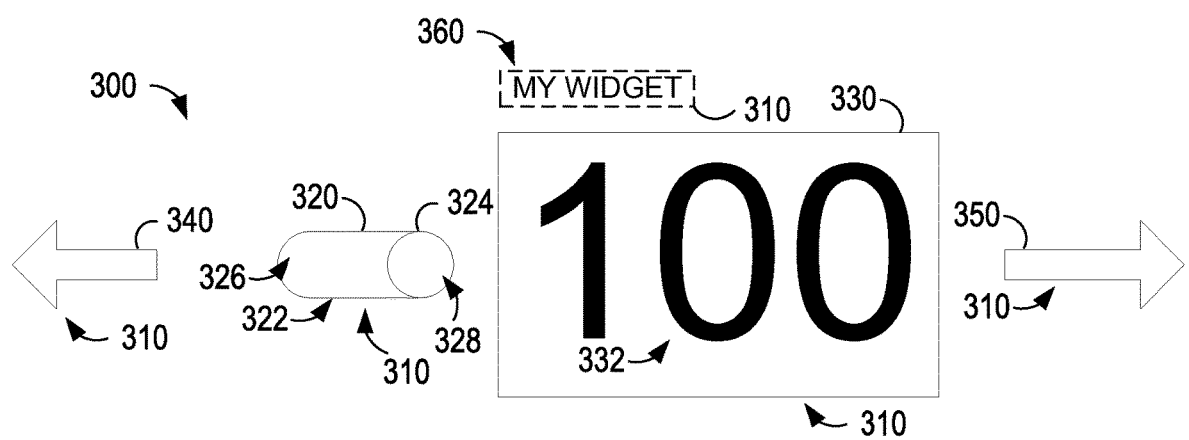

FIGS. 3-5 are partial screenshots of a page 300 of an application 130 (shown in FIG. 1) that is presented at a user device 120 (shown in FIG. 1) (e.g., on or by a presentation device). An application 130 may include one or more pages 300. A page 300 that is currently or actively being presented to a user (e.g., user 190) at the user device 120 is an active page or a live page. Conversely, a page 300 that is not currently or actively presented to the user at the user device 120 is not an active page or a live page (e.g., an "inactive page").

In some examples, a page 300 corresponds to a discrete element that is presentable at the user device 120 including a web page, a mobile application page, a word processing document, or a presentation slide, and the like. In such examples, if a portion of a discrete page 300 is presented at the user device 120, the discrete page 300, in its entirety, is considered to be active. Alternatively, a page 300 may correspond to a portion of the application 130 (e.g., a portion of a web page, a portion of a mobile application page, a portion of a word processing page, a portion of a presentation slide, a portion of a canvas, a portion of a spreadsheet) that is presentable at the user device 120 at a given or particular time. Application 130 may run on a mobile device completely, run in the cloud completely, or have portions that run on either. In such examples, an active page is dynamically determined based on the portion of the application 130 currently or actively being presented at the user device 120.

A page 300 may include one or more entities 310 that are visually, audibly, and/or haptically presented at the user device 120 such that the entities 310 are perceivable by the user. An entity 310 may include or present any combination of text, images, speech, music, audio, video, graphics, pressures, vibrations, heat, alerts, controls, objects, and the like. In some examples, at least some entities 310 are dynamic. That is, an appearance or expression of a dynamic entity may change relative to its environment. Entities may have code associated with them. Entities may have user interface aspects (e.g., a dynamic slider control), or they may have no user interface (e.g., a script that runs). As one example, the page 300 includes a slider mechanism 320 including a slot 322 and a pin 324 moveable within the slot 322 between a first end portion 326 and a second end portion 328. Slider mechanism 320, slot 322, and pin 324 may each be considered entities. For another example, the page 300 includes a text box 330 configured to change content 332 (e.g., alphanumeric characters, punctuation marks, symbols) of the text box 330 and/or change a size of the content 332 and/or text box 330.

Additionally or alternatively, at least some entities 310 are static. While an appearance or expression of a static entity may change based on a navigation of one or more pages 300 (e.g., scrolling, panning, zooming, rotating, or changing a page 300 may affect an appearance or expression of an entity 310), the static entity does not change relative to its environment. For example, the page 300 includes a first arrow 340 pointing in a first direction (e.g., a left-pointing arrow) and a second arrow 350 pointing in a second direction (e.g., a right-pointing arrow). For another example, the page 300 includes static text 360 (e.g., alphanumeric characters, punctuation marks, symbols).

At least some entities 310 are responsive to a stimulus or triggering event (e.g., data flow, instruction, alert, user input) and are configured to perform an operation upon receiving, detecting, or recognizing the stimulus. In some examples, an operation performed by an entity 310 is readily perceivable by a user. For example, the operation may affect an active page. The screenshots shown in FIGS. 3-5 illustrate the effects of actuating the slider mechanism 320.

The slider mechanism 320 may be configured to receive an instruction from a user (e.g., user input) to position and/or move the pin 324, and the pin 324 may be positioned and/or moved within the slot 322 in accordance with the instruction. In some examples, the slider mechanism 320 is configured to generate a call (e.g., data flow, instruction, alert) based on the position and/or movement of the pin 324, and transmit the call to the text box 330. For example, the call may be configured to change the content 332 of the text box 330 and/or the size of the content 332 and/or text box 330. The text box 330 may receive an instruction from the slider mechanism 320 (e.g., data flow) to change the content 332 of the text box 330 and/or the size of the content 332 and/or text box 330 in accordance with the instruction.

In the screenshot shown in FIG. 3, the pin 324 is positioned at an inner portion of the slot 322, and the text box 330 includes content 332 (e.g., "50") in a medium-sized font. In the screenshot shown in FIG. 4, the pin 324 is positioned at the first end portion 326 of the slot 322, and the text box 330 displays content 332 (e.g., "0") in a smaller-sized font. In the screenshot shown in FIG. 5, the pin 324 is positioned at the second end portion 328 of the slot 322, and the text box 330 is displays content 332 (e.g., "100") in a larger-sized font. Alternatively, an operation performed by an entity 310 is not readily perceivable by a user. For example, the operation may affect a portion of the application 130 that is not on an active page.

In some examples, a user interacts with the application 130 to provide user input associated with a page change. For example, an actuation of the first arrow 340 may remove at least a portion of a first page (e.g., a current page) such that the first page is not an active page and/or present at least a portion of a second page (e.g., a previous page) such that the second page is or will imminently become the active page. Similarly, an actuation of the second arrow 350 may remove at least a portion of a first page (e.g., a current page) such that the first page is not an active page and/or present at least a portion of a second page (e.g., a next page) such that the second page is or will imminently become the active page. As used herein, the term "imminently" may refer to immediately (e.g., in real time) or within a period of time (e.g., within a few seconds, within a few minutes). Thus, an imminent event (e.g., page change) may refer to an event that will occur within the period of time if no action is taken to avoid the event (e.g., canceling or aborting an operation).

As described herein, at least some entities 310 may be a control. For example, the slider mechanism 320 enables a user to control or manage one or more operations. Moreover, at least some operations are readily perceivable by a user (e.g., modifying a user interface aspect) and other operations are not readily perceivable by the user (e.g., generating a service call). For example, an operation may be a variable state or a method of a control.

Figure 6:
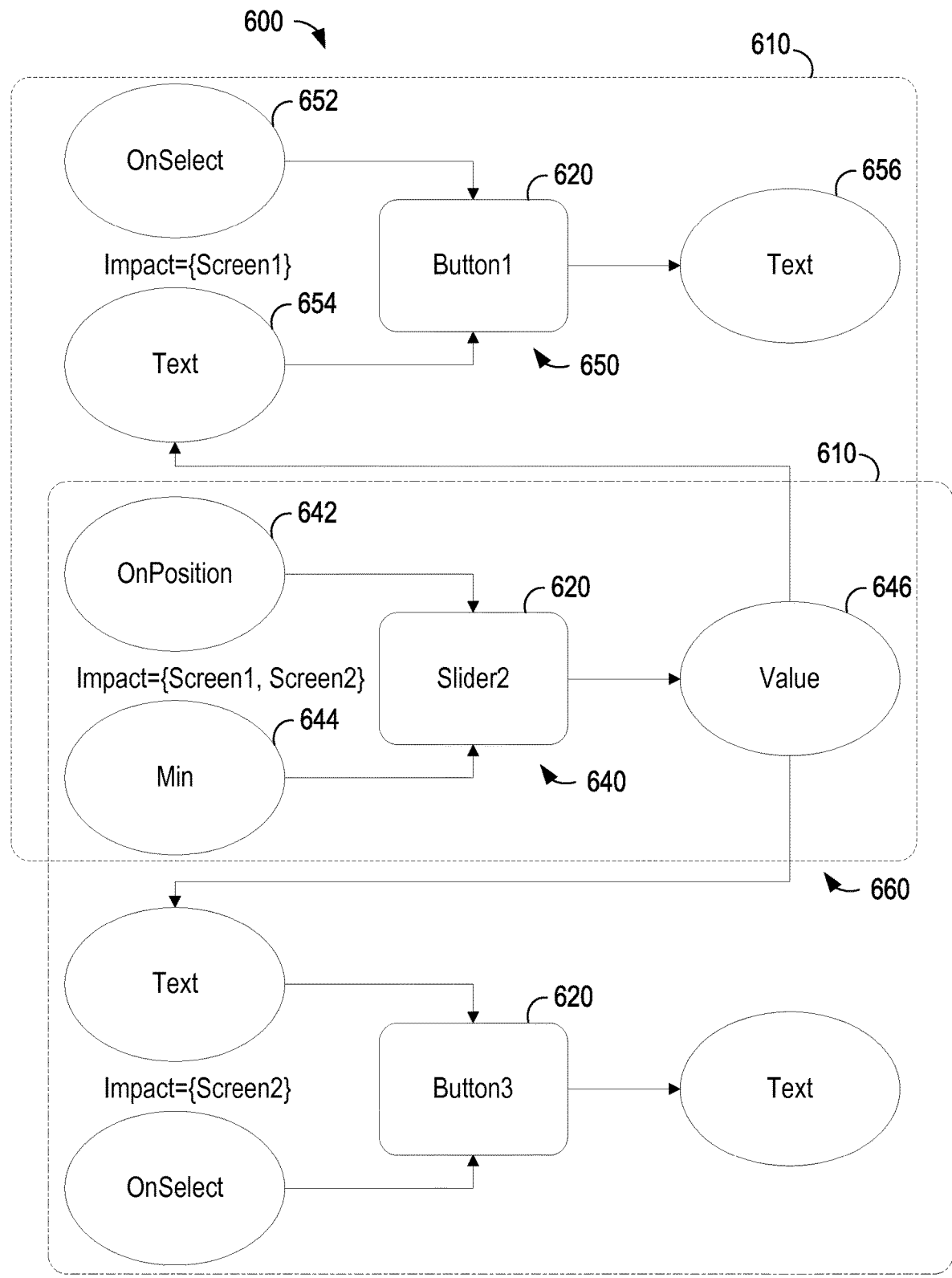
FIG. 6 is a relationship diagram of an example graph including a plurality of nodes that correspond to a plurality of entities, such as the plurality of entities shown in FIGS. 3-5.

FIG. 6 is a relationship diagram of an example graph 600 corresponding to an application 130 (shown in FIG. 1). The graph 600 is a representation of hierarchical declarative transformations of the application 130 and includes one or more regions 610 that correspond to the pages 300 (shown in FIGS. 3-5). As such, an "active region" or a "live region"

may refer to a region 610 that corresponds to an active page. A region 610 may include one or more nodes 620 that correspond to the entities 310 (shown in FIGS. 3-5). An algorithm may be applied to infer a measure of impact for each declarative transformation.

The graph 600 may be annotated with inferred properties at each node 620. Example properties include a measure of impact on a screen, a synchronous or asynchronous nature, a referential transparency, a dependency, and/or other properties propagated from its components. A node 620 is associated with one or more parameters that are representative of a functionality and/or presentation associated with an entity 310 corresponding to the node 620. A parameter may include an input 630 that is representative of a factor (e.g., content, stimulus) that affects a functionality of a corresponding entity 310, and/or an output 635 that is representative of a factor (e.g., content) that affects a presentation of a corresponding entity 310. For example, a first node 640 may correspond to a first entity (e.g., Slider2) that is responsive to a stimulus 642 (e.g., a user moving or positioning the second entity) having a first threshold 644 (e.g., a minimum threshold) to output content 646 (e.g., a value). For another example, a second node 650 may correspond to a second entity (e.g., Button1) that is responsive to a stimulus 652 (e.g., a user selecting the second entity) to input first content 654 (e.g., text) and output second content 656 (e.g., text).

In some examples, a functionality and/or presentation associated with an entity 310 (e.g., a first entity) is dependent on a functionality and/or presentation associated with another entity 310 (e.g., a second entity). In the example illustrated in FIG. 6, an input of the second entity (e.g., first content 654) is dependent on an output of the first entity (e.g., content 646). That is, a change or manipulation to the first entity may affect a presentation of the first entity and a presentation of the second entity. For example, changing a position of the first entity affects the output content 646, which ultimately affects the second content 656 (via affecting the first content 654). At least some functionalities and/or presentations may be reflective of an asynchronous operation, such as a representational state transfer (REST) service call. Conversely, at least some functionalities and/or presentations may be reflective of a synchronous operation, such as a simple mathematical operation The graph 600 may include and/or be partitioned into a plurality of regions that correspond to a plurality of pages 300 presentable at the user device 120. A region may correspond to a page of entities, but equally, a region may correspond to any logical division of entities such as all entities associated with the user interface, or all entities associated with web services. In some examples, an implementation of the first entity may be configured to affect a first page (e.g., Screen1) and a second page (e.g., Screen2). Upon implementation of the first entity, an implementation of the second entity may occur within a period of time. For example, if a first region 660 corresponding to the first page is an active region (e.g., the first page is an active page), the implementation of the second entity occurs within the period of time (e.g., the implementations of the first entity and the second entity are synchronous). That is, the second entity is implemented within the period of time because the second entity is configured to affect the active page. Conversely, the implementation of the second entity may occur after an expiration of the period of time. For example, if the first region 660 corresponding to the first page is not an active region and/or a second region 670 corresponding to the second page is an active region, the implementation of the second entity is deferred and does not occur within the period of time (e.g., the implementations of the first entity and the second entity are asynchronous). That is, the second entity is not implemented within the period of time because the second entity is not configured to affect the active page. In some examples, various implementation strategies are employed to encode synchronous and asynchronous logic, resulting in a hybrid synchronous-asynchronous overall representation that may defer implementations of at least some entities 310 based on generated impact data.

Figure 7:
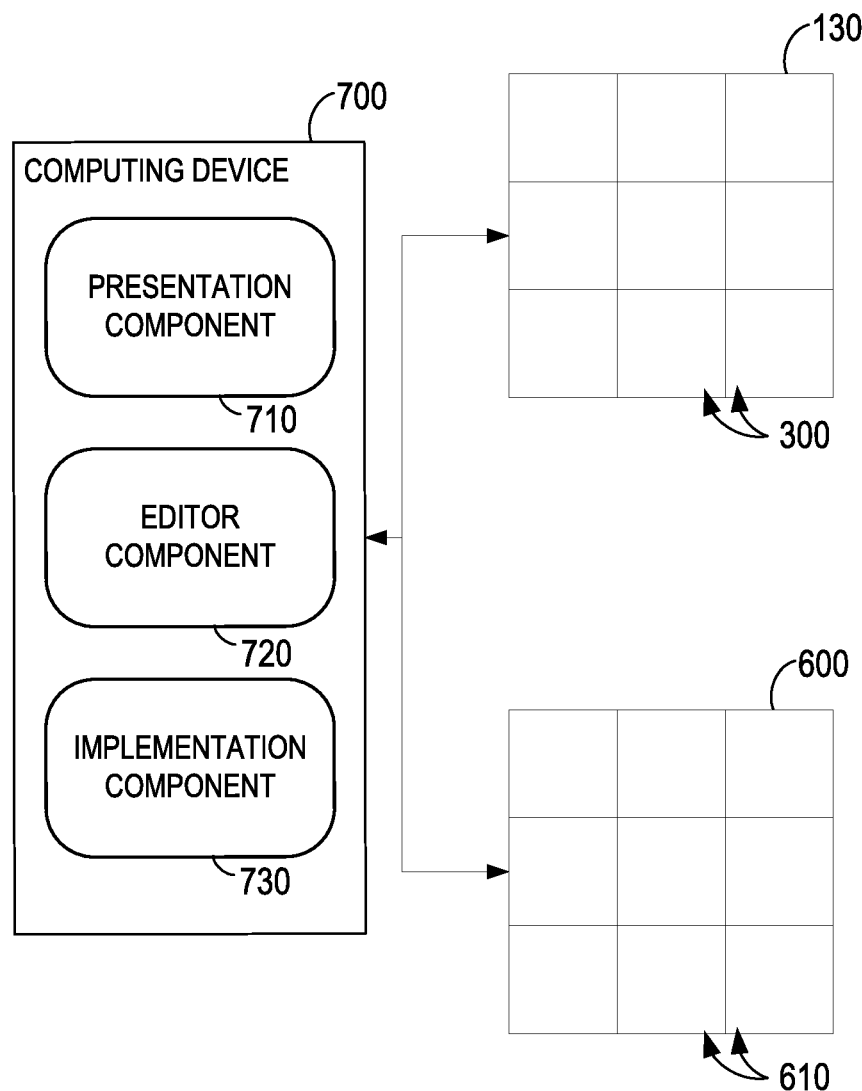
FIG. 7 is a block diagram of an example cloud computing device that may be used to generate or modify an application.

FIG. 7 is a block diagram of an example computing device 700 (e.g., cloud system 110) that may be used to generate or modify an application 130 including one or more pages 300 and/or a graph 600 including one or more regions 610. The computing device 700 includes a presentation device or component 710 configured to present a plurality of displays or pages 300. In some examples, the presentation component 710 presents an active page including one or more entities 310 to a user. The entities 310 may include a first entity and a second entity that are presentable on or by the presentation component 710. Contrary to the page 300 presented on or by the presentation component 710, a page 300 that is not presented on or by the presentation component 710 is not an active page (e.g., an "inactive page"). An inactive page may become an active page, for example, via a page change.

In some examples, the computing device 700 includes an editor component 720 configured to generate a graph 600 that corresponds to the application 130. The graph 600 includes an active region corresponding to the active page. For example, the active region may include one or more nodes 620 corresponding to the entities 310 presented on or by the active page. The nodes 620 may include a first node 640 corresponding to a first entity and/or a second node 650 corresponding to a second entity. In some examples, the graph 600 includes a plurality of regions including the active region and one or more regions that are not the active region (e.g., an "inactive region"). An inactive region may become an active region, for example, when a page corresponding to the inactive region becomes an active page.

The computing device 700 includes an implementation component 730 configured to receive an instruction to implement a first operation associated with a first node 640. For example, the computing device 700 may present a first entity (e.g., the slider mechanism 320) on the active page and receive user input to actuate the first entity. The user input may be received by the implementation component 730 as an instruction to implement a first operation associated with a first node corresponding to the first entity (e.g., the first node 640). Based on the instruction, the implementation component 730 is configured to determine whether a second entity corresponding to a second node is presented on an active page.

In some examples, the implementation component 730 is configured to determine whether a change to a first entity is configured to affect change to a second entity. If the first entity is configured to affect change (e.g., in functionality and/or presentation) of the second entity, a second node corresponding to the second entity is related to the first node. That is, the second node is identified as being related to the first node when a change or manipulation to the first entity is determined to affect change to the second entity.

In response to determining that the second entity is presented on an active page, the implementation component 730 implements a second operation associated with the second node 650 within a period of time. For example, the implementation component 730 may change content 332 of a text box 330 and/or change a size of the content 332 and/or text box 330. In some examples, the period of time is determined based on a factor, such as a latency associated with a service call to the second node 650. Conversely, in response to determining that the second entity is not presented on an active page, the implementation component 730 does not implement a second operation associated with the second node 650 within a period of time. The implementation component 730 may implement the second operation after the period of time expires. For example, the implementation component 730 may implement the second operation imminently after the expiration of the period of time, or may periodically or intermittently determine whether to implement the second operation after the expiration of the period of time.

Figure 8:
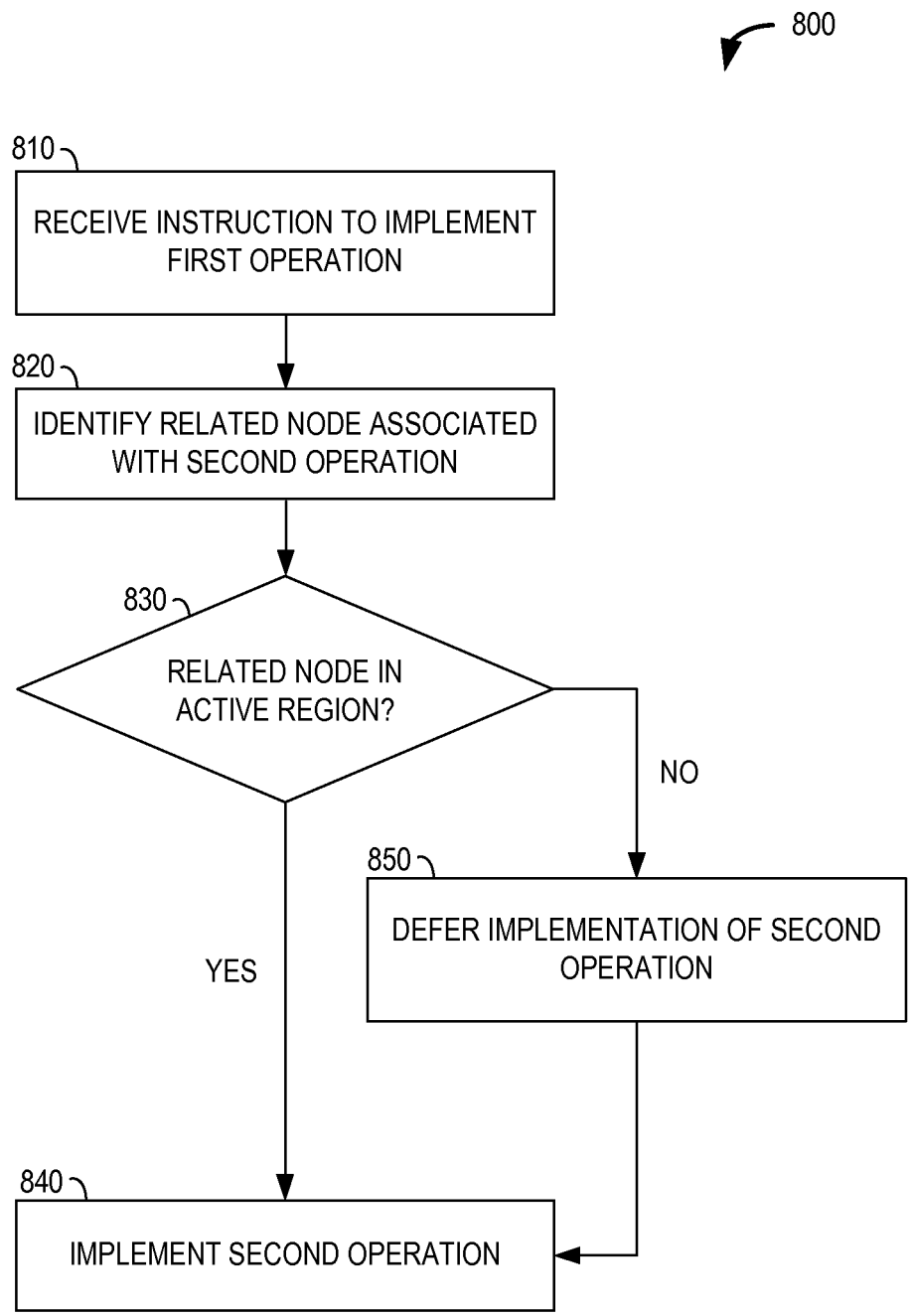
FIGS. 8 and 9 are flowcharts of an example method for generating a deferrable data flow using a computing device, such as the cloud computing device shown in FIG. 7.

FIG. 8 is a flowchart of an example method 800 including a plurality of operations to generate a deferrable data flow based on a relationship between entities using a computing device (e.g., cloud system 110). At 810, an instruction to implement a first operation is received. The first operation may be associated with a first node 640 of a plurality of nodes 620 arranged in a plurality of regions 610. A second node 650 related to the first node 640 is identified at 820. In some examples, the second node 650 is identified by determining an entity that is affected by a change to the first entity corresponding to the first node 640. The second node 650 is associated with a second operation. The second operation may include, for example, any operation that is triggered by the first operation, such as generating a service call (e.g., an asynchronous web service call, a synchronous web service call), retrieving data, modifying content, participating in social networking service (e.g., posting, commenting, chatting, replying), and the like. An operation may include a method call on an entity, a web service call, a long running computation, or any other computational work to be performed.

At 830, it is determined whether the second node 650 is in or associated with an active region. If the second node 650 is in the active region, the second operation is implemented at 840 within a period of time. On the other hand, if the second node 650 is not in the active region, the second operation is deferred at 850 for at least the period of time. In another embodiment, the second operation may also be deferred for a second period of time different than the period of time required if in the active region. In at least some examples, the second operation is implemented at 840 after the second operation is deferred.

Figure 9:
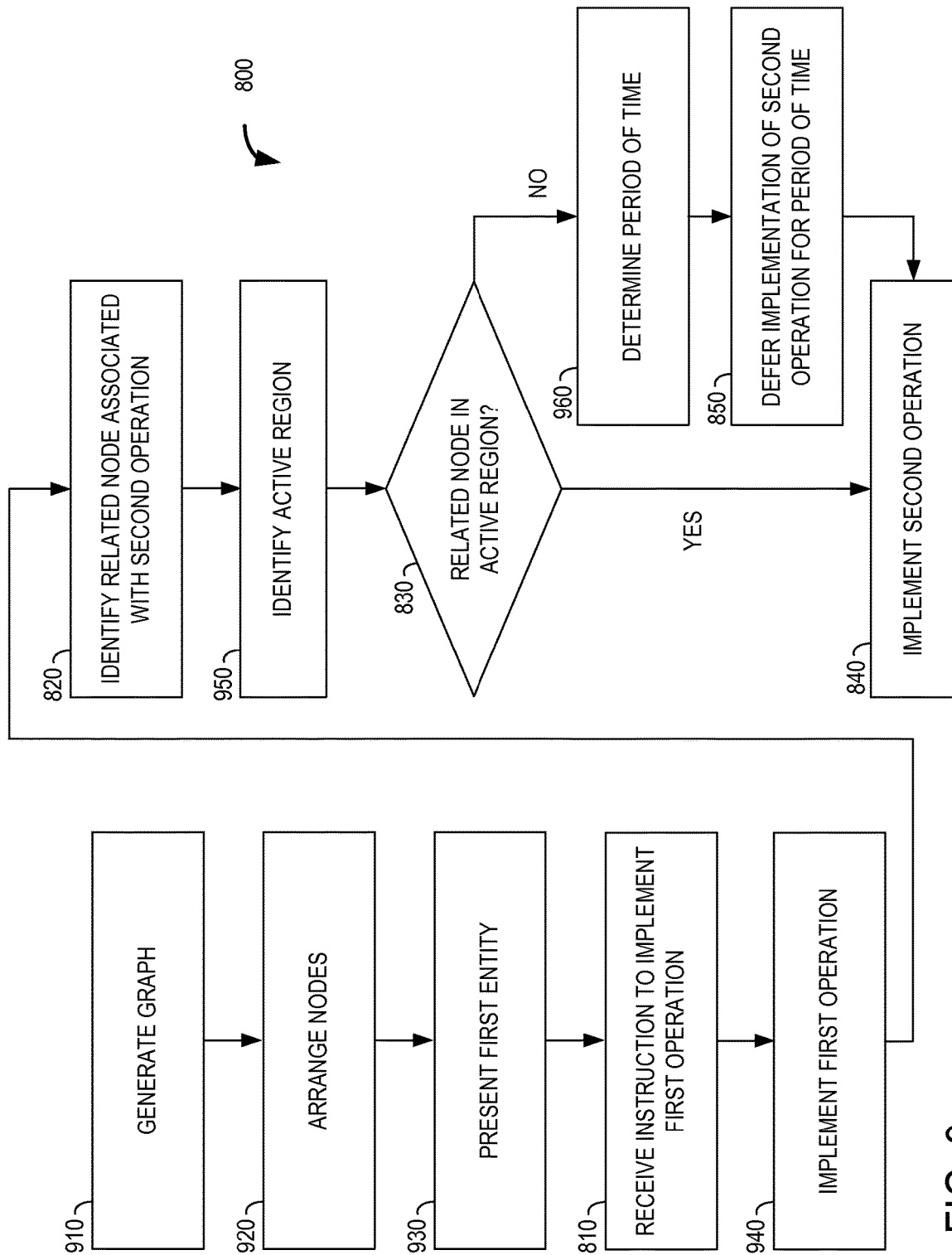

FIG. 9 is a detailed flowchart of the method 800. A graph 600 including a plurality of nodes 620 may be generated at 910. The nodes 620 correspond to a plurality of entities 310 including a first entity corresponding to the first node 640 and a second entity corresponding to the second node 650. The graph 600 may include a plurality of regions 610 corresponding to a plurality of displays presentable on or by a presentation device. For example, an active region corresponds to an active display presented on or by the presentation device. The nodes 620 are arranged in the regions 610 at 920 such that a first set of nodes (including at least the first node 640) associated with a first set of entities presented on a first display is arranged in a first region 660, and a second set of nodes associated with a second set of entities presented on a second display is arranged in a second region 670.

The first entity corresponding to the first node 640 may be presented at the active display on or by the presentation device at 930. At 810, an instruction to implement a first operation associated with the first entity is received. The first operation may be associated with the first node 640 arranged in the active region. The first operation is implemented at 940. For example, a pin 324 may be moved between a first position and a second position. At 820, the second node 650 related to the first node 640 is identified. For example, the second node 650 may be identified by determining an entity that is affected by a change to the first entity corresponding to the first node 640. The second node 650 is associated with a second operation. The second operation may include, for example, any operation that is triggered by the first operation, such as generating a service call (e.g., an asynchronous web service call, a synchronous web service call), retrieving data, modifying content, participating in social networking service (e.g., posting, commenting, chatting, replying), and the like.

In some examples, an active region may be identified at 950. For example, a set of entities presented on an active display on or by a presentation device may be identified, and the active region may be determined based on the identified set of entities. At 830, it is determined whether the second node 650 is in an active region. For example, it may be determined whether a second entity corresponding to the second node 650 is in the identified set of entities.

If the second node 650 is in the active region, the second operation is implemented at 840 within a period of time. On the other hand, if the second node 650 is not in the active region, the second operation is deferred at 850 for at least the period of time. In some examples, the period of time may be determined at 960 based on a factor. For example, the period of time may be determined based on an expected latency associated with a service call to the second node 650. In at least some examples, the second operation is implemented at 840 after the second operation is deferred.

Figure 10:
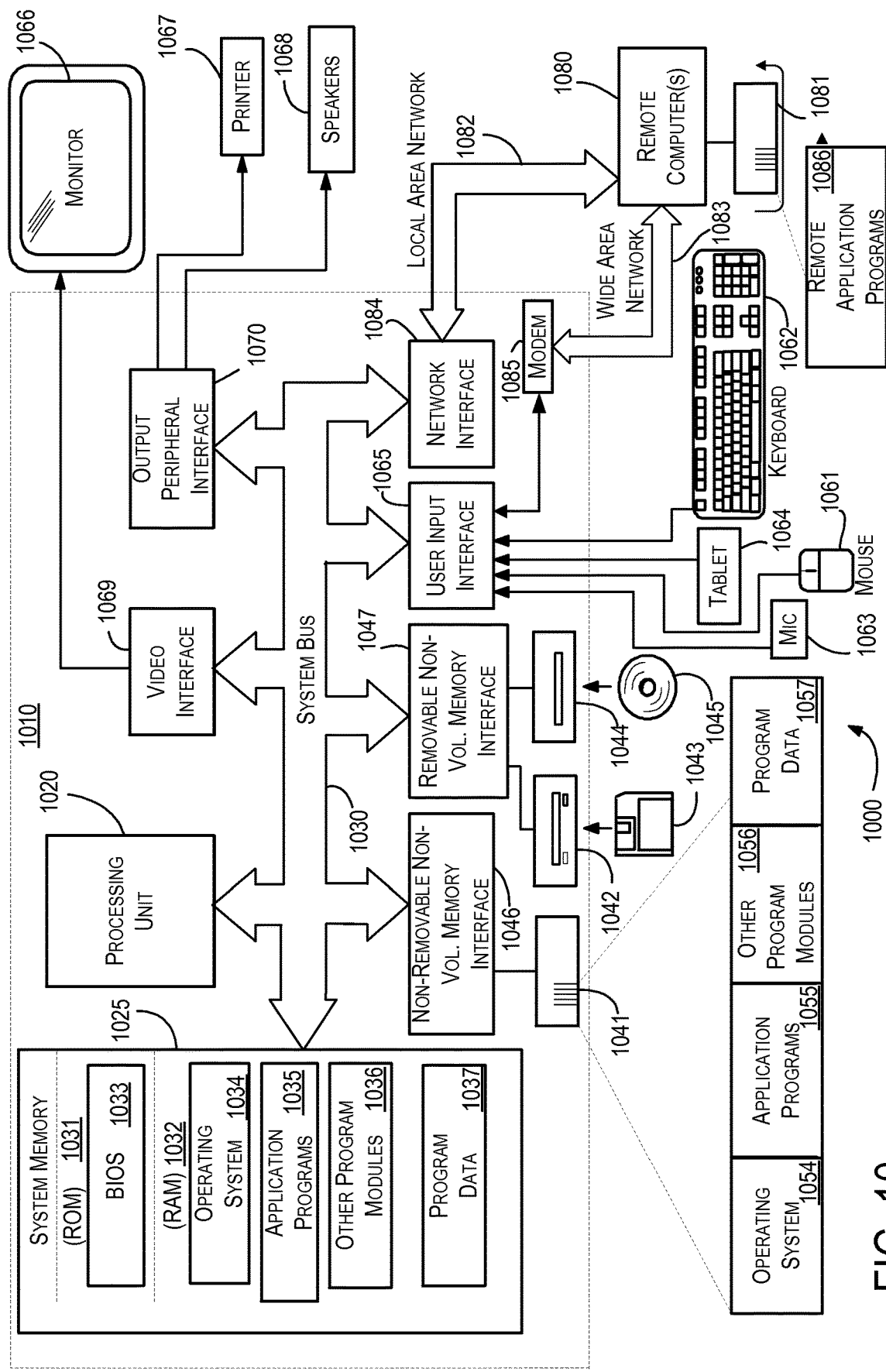
FIG. 10 is a block diagram of an example computing device that may be used to generate a deferrable data flow.

FIG. 10 is a block diagram of an example operating environment 1000 that may be used to generate a deferrable data flow in the environment 100 (shown in FIG. 1). The operating environment 1000 is only one example of a computing and networking environment and is not intended to suggest any limitation as to the scope of use or functionality of the disclosure. The operating environment 1000 should not be interpreted as having any dependency or requirement relating to any one or combination of components illustrated in the example operating environment 1000.

The disclosure is operational with numerous other computing and networking environments or configurations. While some examples of the disclosure are illustrated and described herein with reference to the operating environment 1000 being or including a cloud system 110 (shown in FIG. 1), aspects of the disclosure are operable with any computing device (e.g., user device 120, communication server 150, authentication server 160, application server 170, data source 210, application generation device 220, application gallery 230, first user device 245, second user device 250, computing device 700) that executes instructions to implement the operations and functionality associated with the operating environment 1000.

For example, the operating environment 1000 may include a mobile device, a mobile telephone, a phablet, a tablet, a portable media player, a netbook, a laptop, a desktop computer, a personal computer, a server computer, a computing pad, a kiosk, a tabletop device, an industrial control device, multiprocessor systems, microprocessor-based systems, set top boxes, programmable consumer electronics, network computers, minicomputers, mainframe computers, distributed computing environments that include any of the above systems or devices, and the like. The operating environment 1000 may represent a group of processing units or other computing devices. Additionally, any computing device described herein may be configured to perform any operation described herein including one or more operations described herein as being performed by another computing device.

With reference to FIG. 10, an example system for implementing various aspects of the disclosure may include a general purpose computing device in the form of a computer 1010. Components of the computer 1010 may include, but are not limited to, a processing unit 1020, a system memory 1025, and a system bus 1030 that couples various system components including the system memory 1025 to the processing unit 1020. The system bus 1030 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 1025 includes any quantity of media associated with or accessible by the processing unit 1020. For example, the system memory 1025 may include computer storage media in the form of volatile and/or nonvolatile memory such as read only memory (ROM) 1031 and random access memory (RAM) 1032. The ROM 1031 may store a basic input/output system 1033 (BIOS) that facilitates transferring information between elements within computer 1010, such as during start-up. The RAM 1032 may contain data and/or program modules that are immediately accessible to and/or presently being operated on by processing unit 1020. For example, the system memory 1025 may store computer-executable instructions, communication data, authentication data, application data, and other data.

The processing unit 1020 may be programmed to execute the computer-executable instructions for implementing aspects of the disclosure, such as those illustrated in the figures (e.g., FIGS. 8 and 9). By way of example, and not limitation, FIG. 10 illustrates operating system 1034, application programs 1035, other program modules 1036, and program data 1037. The processing unit 1020 includes any quantity of processing units, and the instructions may be performed by the processing unit 1020 or by multiple processors within the operating environment 1000 or performed by a processor external to the operating environment 1000.

The system memory 1025 may include a presentation component 710 (shown in FIG. 7), an editor component 720 (shown in FIG. 7), and/or an implementation component 730 (shown in FIG. 7). Upon programming or execution of these components, the operating environment 1000 and/or processing unit 1020 is transformed into a special purpose microprocessor or machine. For example, the presentation component 710, when executed by the processing unit 1020, causes the processing unit 1020 to present one or more displays; the editor component 720, when executed by the processing unit 1020, causes the processing unit 1020 to generate one or more graphs including one or more nodes; and implementation component 730, when executed by the processing unit 1020, causes the processing unit 1020 to determine whether an entity is presented on an active page, implement an operation within a period of time when the entity is presented on an active page, and defer implementation of an operation until after a period of time is expired when the entity is not presented on the active page. Although the processing unit 1020 is shown separate from the system memory 1025, embodiments of the disclosure contemplate that the system memory 1025 may be onboard the processing unit 1020 such as in some embedded systems.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1042 that reads from or writes to a removable, nonvolatile magnetic disk 1043 (e.g., a floppy disk, a tape cassette), and an optical disk drive 1044 that reads from or writes to a removable, nonvolatile optical disk 1045 (e.g., a compact disc (CD), a digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 1041 may be connected to the system bus 1030 through a non-removable memory interface such as interface 1046, and magnetic disk drive 1042 and optical disk drive 1044 may be connected to the system bus 1030 by a removable memory interface, such as interface 1047.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1054, application programs 1055, other program modules 1056 and program data 1057. Note that these components may either be the same as or different from operating system 1034, application programs 1035, other program modules 1036, and program data 1037. Operating system 1054, application programs 1055, other program modules 1056, and program data 1057 are given different numbers herein to illustrate that, at a minimum, they are different copies.

The computer 1010 includes a variety of computer-readable media. Computer-readable media may be any available media that may be accessed by the computer 1010 and includes both volatile and nonvolatile media, and removable and non-removable media.

By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 1031 and RAM 1032 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 1010. Computer storage media are implemented in hardware and exclude carrier waves and propagated signals. Any such computer storage media may be part of computer 1010.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 1010 through one or more input devices, such as a pointing device 1061 (e.g., mouse, trackball, touch pad), a keyboard 1062, a microphone 1063, and/or an electronic digitizer 1064 (e.g., tablet). Other input devices not shown in FIG. 10 may include a joystick, a game pad, a controller, a satellite dish, a camera, a scanner, an accelerometer, or the like. These and other input devices may be coupled to the processing unit 1020 through a user input interface 1065 that is coupled to the system bus 1030, but may be connected by other interface and bus structures, such as a parallel port, game port or a universal serial bus (USB).

Information, such as text, images, audio, video, graphics, alerts, and the like, may be presented to a user via one or more presentation devices, such as a monitor 1066, a printer 1067, and/or a speaker 1068. Other presentation devices not shown in FIG. 10 may include a projector, a vibrating component, or the like. These and other presentation devices may be coupled to the processing unit 1020 through a video interface 1069 (e.g., for a monitor 1066 or a projector) and/or an output peripheral interface 1070 (e.g., for a printer 1067, a speaker 1068, and/or a vibration component) that are coupled to the system bus 1030, but may be connected by other interface and bus structures, such as a parallel port, game port or a USB. In some examples, the presentation device is integrated with an input device configured to receive information from the user (e.g., a capacitive touch-screen panel, a controller including a vibrating component). Note that the monitor 1066 and/or touch screen panel may be physically coupled to a housing in which the computing device 1010 is incorporated, such as in a tablet-type personal computer.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1082 and one or more wide area networks (WAN) 1083, but may also include other networks. Such networking environments are commonplace in offices, enterprise-wide computer networks, intranets and the Internet.

When used in a LAN networking environment, the computer 1010 is coupled to the LAN 1082 through a network interface or adapter 1084. When used in a WAN networking environment, the computer 1010 may include a modem 1085 or other means for establishing communications over the WAN 1083, such as the Internet. The modem 1085, which may be internal or external, may be connected to the system bus 1030 via the user input interface 1065 or other appropriate mechanism. A wireless networking component such as comprising an interface and antenna may be coupled through a suitable device such as an access point or peer computer to a LAN 1082 or WAN 1083. In a networked environment, program modules depicted relative to the computer 1010, or portions thereof, may be stored in the remote memory storage device. By way of example, and not limitation, FIG. 10 illustrates remote application programs 1086 as residing on memory storage device 1081. It may be appreciated that the network connections shown are examples and other means of establishing a communications link between the computers may be used.

The block diagram of FIG. 10 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 10 may be performed by other elements in FIG. 10, or an entity (e.g., processor, web service, server, applications, computing device, etc.) not shown in FIG. 10.

The subject matter described herein enables a computing device to determine whether to implement an operation within a period of time or after an expiration of the period of time. For example, an operation affecting an active display may be implemented within the period of time, and an operation not affecting the active display may be implemented after the expiration of the period of time. In this way, the computing device may be configured to manage computational resources within the period of time.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Examples of the disclosure may also be practiced in distributed computing environments where tasks are performed by remote processing devices that are linked through a communications network. In a distributed computing environment, program modules may be located in local and/or remote computer storage media including memory storage devices.

The examples illustrated and described herein as well as examples not specifically described herein but within the scope of aspects of the disclosure constitute example means for generating a deferrable data flow based on a relationship between entities. For example, the elements illustrated in FIGS. 1, 2, 7, and/or 10, such as when encoded to perform the operations illustrated in FIGS. 8 and 9 constitute at least an example means for presenting a plurality of displays, an example means for generating a graph including a plurality of nodes (e.g., a first node and a second node), an example means for determining whether an entity (e.g., a second entity) is presented on an active page, an example means for implementing an operation within a period of time or after an expiration of the period of time.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

generating a graph including a plurality of nodes corresponding to a plurality of entities;

generating a graph including a plurality of regions corresponding to a plurality of displays;

arranging a plurality of nodes in a plurality of regions such that a first set of nodes associated with a first set of entities presented on a first display is arranged in a first region of the plurality of regions, and a second set of nodes associated with a second set of entities presented on a second display is arranged in a second region of the plurality of regions;

presenting a plurality of displays;
presenting an active page to a user;
presenting an entity corresponding to a first node;
presenting a first entity on an active page;
receiving an instruction to implement a first operation;

identifying a set of entities presented on an active display by a presentation device;

determining an active region;

identifying a second node of the plurality of nodes that is related to the first node;

determining whether a change to a first entity corresponding to the first node is configured to affect change to a second entity corresponding to the second node;

determining whether the second entity is presented on the active page;

determining the period of time based on a factor;

implementing a second operation associated with the second node within a period of time;

not implementing the second operation within the period of time to manage computational resources within the period of time;

implementing the second operation after the period of time expires;

deferring implementation of the second operation until the period of time is expired; and presenting an entity that is a control.

In some examples, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method comprising:
   presenting, by an application on a user device, a first region of a plurality of regions;
   receiving an instruction to implement a first operation;
   implementing, by the application, the first operation, wherein the implementing comprises:
      causing a change of the first region,
      causing modification of a remote storage file, and
      triggering a second operation affecting change of a second region of the plurality of regions of the application;
   determining a period of time associated with initiation of the triggered second operation;
   in response to determining that the second region is an active region while implementing the first operation, initiating the second operation within the determined period of time; and
   in response to determining that the second region is not an active region while implementing the first operation, initiating the second operation after expiration of the determined period of time, which causes a reduction of an amount of computational resources consumed by the application within the determined period of time.

2. The computer-implemented method of claim 1, wherein the first operation is associated with a first node of a plurality of nodes, the first node corresponding to the first region, and wherein an individual node of the plurality of nodes is associated with one or more parameters representative of a functionality or presentation associated with an entity corresponding to the individual node.

3. The computer-implemented method of claim 1, wherein the first operation is associated with a first node of a plurality of nodes, the first node corresponding to the first region, and the method further comprises:

generating a graph including the plurality of nodes, the plurality of nodes corresponding to a plurality of entities including a first entity corresponding to the first node and a second entity corresponding to a second node.

4. The computer-implemented method of claim 1, further comprising generating a graph including the plurality of regions, the plurality of regions corresponding to a plurality of pages, including first and second pages, presentable by a presentation device, the active region corresponding to an active page presented by the presentation device.

5. The computer-implemented method of claim 1, wherein the first operation is associated with a first node of a plurality of nodes, the first node corresponding to the first region, and the method further comprises:

arranging the plurality of nodes in the plurality of regions such that a first set of nodes associated with a first set of entities presented on a first display is arranged in the first region of the plurality of regions, and a second set of nodes associated with a second set of entities presented on a second display is arranged in the second region of the plurality of regions.

6. The computer-implemented method of claim 1, further comprising:

identifying a set of entities presented on an active page by a presentation device; and based on the identified set of entities, determining the active page.

7. The computer-implemented method of claim 1, wherein the period of time is based at least on an expected latency of a synchronous service call of the second operation.

8. The computer-implemented method of claim 1, wherein the period of time is based at least on an expected latency of an asynchronous service call of the second operation.

9. A computing device comprising:

a presentation device that presents an active region to a user;

a memory that stores computer-executable instructions; and a processor that executes the computer-executable instructions to:

generate a graph including a first node and a second node related to the first node, the first node corresponding to a first entity presentable on a first region, the second node corresponding to a second entity presentable on a second region;

receive an instruction to implement a first operation associated with the first node;

implement the first operation, wherein the implementing causes modification of a remote storage file, and wherein the modification of the remote storage file causes a change of a presentation of the second region;

determining a period of time associated with affecting the change of the presentation of the second region;

in response to determining that the second region is the active region, implement a second operation associated with the second node within the period of time; and in response to determining that the second region is an inactive region, cause a reduction of computational resources consumed within the period of time by deferring defer implementation of the second operation until the period of time is expired.

10. The computing device of claim 9, wherein the processor is configured to execute the computer-executable instructions to generate the graph to include a plurality of regions, a first region of the plurality of regions corresponding to the active region.

11. The computing device of claim 9, wherein the processor is configured to execute the computer-executable instructions to:

determine whether a change to the first node is configured to affect change to the second entity; and in response to determining that the change to the first node is configured to affect change to the second entity, identify the second node as being related to the first node.

12. The computing device of claim 9, wherein the period of time is based at least on an expected latency of a synchronous service call of the second node.

13. The computing device of claim 9, wherein the period of time is based at least on an expected latency of an asynchronous service call of the second node.

14. A system comprising:

a presentation device configured to present a plurality of pages;

an editor, executed by at least one processor, configured to generate a graph including a first node and a second node related to the first node, the first node corresponding to a first entity presentable on a first page of the plurality of pages, the second node corresponding to a remotely operated social networking service entity presentable on a second page of the plurality of pages; and an operation implementer, executed by at least one processor, configured to:

receive an instruction to implement a first operation associated with the first node;

implement the first operation, wherein the implementing causes:

modification of a remote storage file, and participation in a remotely operated social networking service, that causes a change of the second node;

determine whether the second page is an active page;

determine a period of time associated with changing the presentation of the remotely operated social networking service entity;

in response to determining that the second page is active page, implement the participation in the remotely operated social networking service associated with the second node within period of time; and in response to determining that the second page is an inactive page, reducing computational resources consumed within the period of time by deferring implementing the participation in the remotely operated social networking service at least until after the period of time expires.

15. The system of claim 14, wherein the editor is configured to generate the graph to include a plurality of regions, a first region of the plurality of regions corresponding to the first page, the first page being an active page when the instruction is received to implement the first operation associated with the first node.

16. The system of claim 14, wherein the presentation device is configured to present the first entity on the first page.

17. The system of claim 14, wherein the operation implementer is configured to:

determine whether a change to the first node is configured to affect change to the remotely operated social networking service entity; and in response to determining that the change to the first node is configured to affect change to the remotely operated social networking service entity, identify the second node as being related to the first node.

18. The system of claim 14, wherein one or more of the first entity and a second entity is a control.

19. The system of claim 14, wherein the period of time is based at least on an expected latency of a synchronous service call of the second node.

20. The system of claim 14, wherein the period of time is based at least on an expected latency of an asynchronous service call of the second node.

* * * * *